May 30, 1939.  R. H. BENTLEY  2,160,713
MEANS FOR MOUNTING INTERCHANGEABLE ELECTRIC DEVICES
Filed Oct. 7, 1937
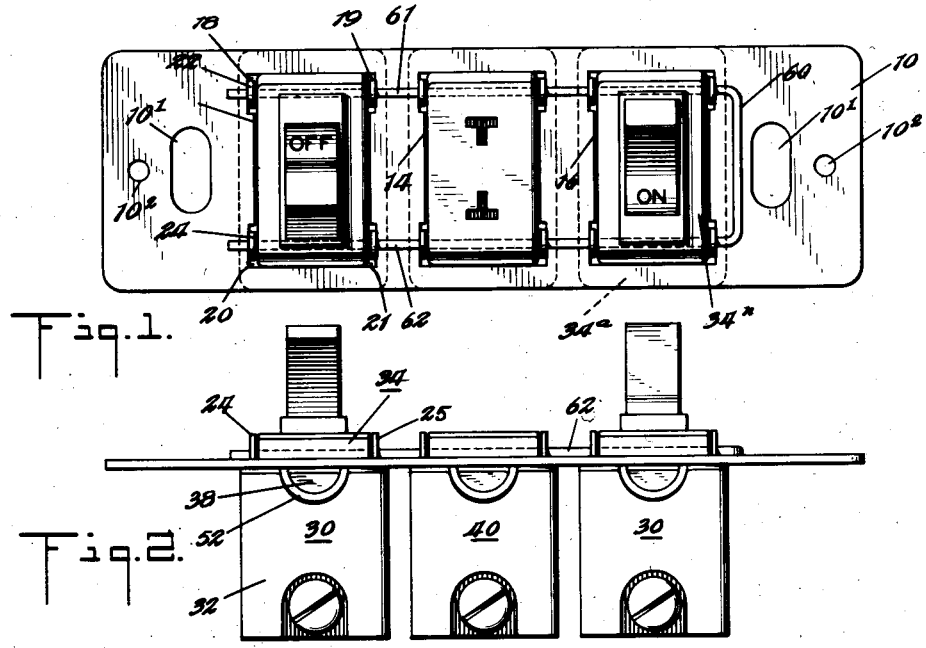
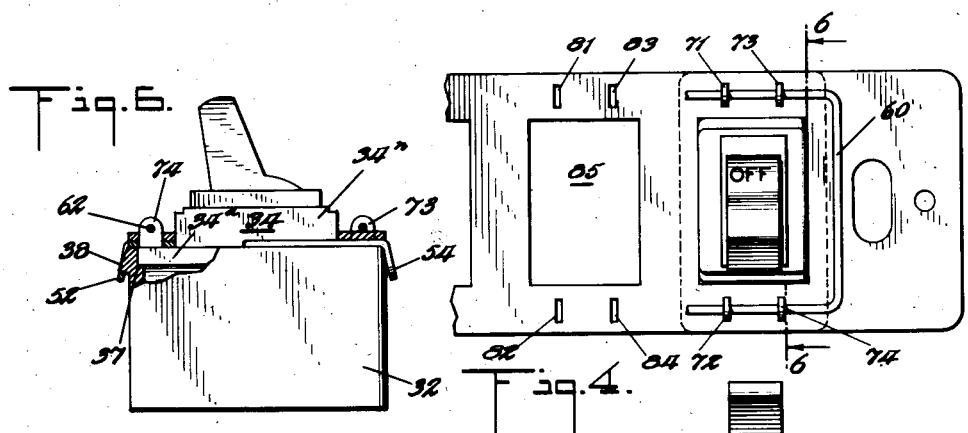
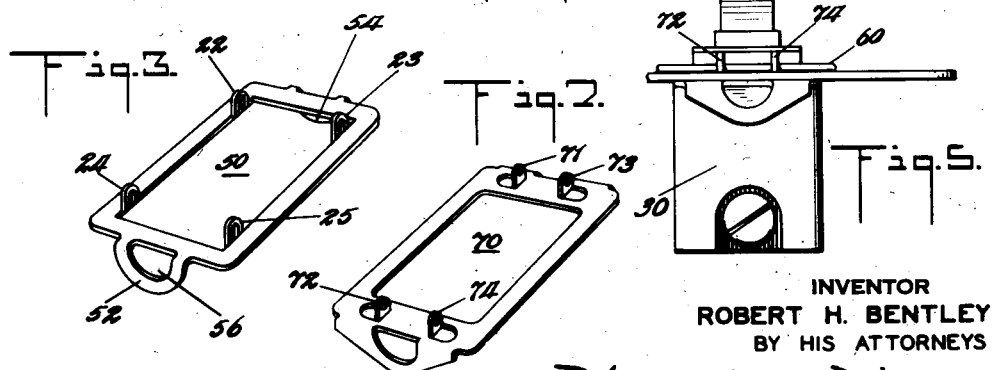
INVENTOR
ROBERT H. BENTLEY
BY HIS ATTORNEYS
Howson and Howson Patented May 30, 1939

2,160,713

UNITED STATES PATENT OFFICE 2,160,713

MEANS FOR MOUNTING INTERCHANGEABLE ELECTRIC DEVICES

Robert H. Bentley, Hartford, Conn., assignor to The Arrow-Hart & Hegeman Electric Company, Hartford, Conn., a corporation of Connecticut Application October 7, 1937, Serial No. 167,862

9 Claims. (Cl. 174—53)

This invention relates to means for supporting a plurality of electric devices upon a mounting bridge such as the bridge which customarily extends across the face of a switch box or wall box. The devices which may be supported upon the bridge may include various types of switches, attachment plug receptacles, pilot lights, and other electric wiring devices. Usually, the size of these devices will be approximately equal.

It is an object of my invention to provide an improved means for mounting one or more electric wiring devices upon a mounting bridge, which means shall be of adequate strength, of low cost of manufacture and shall require a minimum of time of the electrician in assembling the devices upon the bridge when the devices are installed in a building.

Another object of my invention is to provide an improved means for mounting one or more electric wiring devices upon a supporting bridge in which the strain incident to the operation of the device shall be transmitted through metallic members to the supporting bridge so as to relieve the casing the wiring device of as much strain as possible. Other objects and advantages of my invention will become apparent as it is described in connection with the accompanying drawing.

In the drawing—

Figure 1 is a plan view of one form of the invention.

Figure 2 is a side elevation view of the invention shown in Figure 1.

Figure 3 is a perspective view of the frame which serves to hold the parts of the casing together and assists in supporting the wiring device upon the mounting bridge.

Figure 4 is a fragmentary plan view of another form of the invention, in which only one of the wiring devices is in assembled position.

Figure 5 is a fragmentary side elevation view of the form of invention shown in Figure 4, only one of the devices being mounted in its place upon the bridge.

Figure 6 is an end elevation view partly broken away of the form of invention shown in Figures 4 and 5.

Figure 7 is a perspective view of the frame employed for securing the parts of the wiring device casing together and for assisting in holding the device upon the bridge.

Referring to the form of invention shown in Figures 1, 2 and 3 of the drawing, the wiring devices 30, 30, 40 are mounted upon a supporting bridge 10 which is of such size as to extend across the top of a single-gang electric switch box, but the invention is equally capable of use in larger sizes. The usual holes 10—1, 10—2 are provided in the bridge for reception of screws to mount the bridge upon the switch box and for reception of screws to secure a face plate to the bridge. The bridge preferably is provided with three identical substantially rectangular apertures 12, 14 and 16 spaced apart along the length of the bridge. The side edges of each of these apertures are recessed adjacent the corners as at 18, 19, 20, 21 to provide passage for ears 22, 23, 24, 25 as hereinafter more fully described. Into each of the apertures 12, 14 and 16 the neck of a wiring device, such as toggle switches 30 or attachment plug receptacle 40 may be inserted from the rear.

The wiring device or switch 30 may comprise a shell or bottom portion 32 having substantially rectangular prismatic form with its back or bottom portion closed and its top or front portion open for the reception of switch mechanism (not shown). When the switch mechanism is within the shell a cover 34 may be placed thereon thus sealing all of the parts of the mechanism within a casing. The switch mechanism and casing in the form of invention shown in Figures 1 to 3 may be the same as that shown in Figures 4 to 7. Therefore, similar reference numbers are used to describe the equivalent parts in each form. The cover 34 may comprise a neck $34^n$ which rises from the main body $34^a$ of the cover, this main body being of shape and area approximately equal to the opening in the top of the shell. In order that the cover may rest in the top portion of the shell the top peripheral edges of the shell are recessed providing a shoulder or ledge 37 upon which the main body $34^a$ of the cover rests. The neck $34^n$ of the cover will preferably be of less cross sectional area than the main body of the cover will be approximately equal to the shape and area of the bridge apertures 12, 14 and 16.

In order to secure the cover and shell together, I have provided a frame 50 which not only performs the function of securing the shell and cover together, but also is instrumental in supporting the wiring device upon the bridge, as will hereinafter more fully appear. The frame in the type of invention shown in Figures 1 to 3 is of substantially rectangular form, having a large central aperture for reception of the neck $34^n$ of the wiring device. The frame may be stamped from sheet metal with semi-circular extensions 52 and 54 at its ends. These extensions have semi-circular apertures such as 56 punched in them and the extensions may be bent down at substantially right angles to the plane of the frame so that the apertures 56 receive protuberances such as 38 formed on the shell 32 at the top edges of the end walls. The protuberances may be of approximately the same shape and area as the apertures 56. It may now be observed that when the extensions 52 engage under the edges of the protuberances 38 the frame will hold the cover and shell together securely in a permanent fashion, although due to the fact that the extensions may be easily bent out of engagement with the protuberances, the cover may be separated from the shell if it becomes necessary to repair the switch or replace any parts therein.

In order that the wiring device may be secured upon the mounting bridge 10, two oppositely facing pairs of apertured lugs or ears 22, 23 and 24, 25 are formed on the frame 50 extending inwardly and being bent up at right angles to the plane of the frame in position to extend through the previously mentioned recess 18, 19, 20 and 21 formed in the corners of the bridge aperture 12. These lugs or supporting ears lie alongside the neck of the wiring device and opposite ears are in alignment, in order that a supporting member 60 comprising a piece of wire bent into U-shape may have its parallel side arms 61, 62 pass through the apertures in the supporting ears. Passages through the necks of the wiring devices are provided for the securing member 60, these passages being in alignment with the apertures in the supporting ears 18, 19, 20 and 21.

In the form of device shown in Figures 4 to 7, the supporting frame differs slightly from that in the form of the invention just described. The frame 70 in Figures 4 to 7 has its oppositely facing pairs of supporting ears or lugs 71, 73 and 72, 74 punched up out from the end areas of the frame beyond the end faces of the neck of the wiring device. These ears, however, serve the same purpose and are provided with openings for the reception of a securing member 60 in the same manner as in the form of invention previously described. In the form of invention of Figures 4-7 pairs of holes, such as 81—84 are provided in the mounting bridge for reception of the supporting ears 71—74, positioned in the areas of the bridge between the outside edges of the bridge and the shorter edges of the bridge apertures. All apertures are in alignment, as are the supporting ears within them, so that one securing device will suffice for mounting several devices on one bridge.

In the form shown in Figures 4 to 7 it is not necessary to provide passages in the neck of the wiring device, nor is it necessary to provide the recesses 18, 19, etc., in the corners of the bridge apertures. The bridge apertures may be in the form of a pure rectangle, as 85. Or in either type of the invention the bridge apertures may be in any form that it is desired to give to the neck of the wiring device.

It will be apparent that if the bridge apertures are identical and the necks of the various wiring devices are of equal cross-sectional area the wiring devices may be interchangeably placed in any desired apertures. The invention however, is neither limited to the interchangeable type of devices nor to a non-interchangeable type. It is applicable to each type.

From the foregoing it will be seen that I have provided a novel means for mounting electric wiring devices upon a supporting bridge, this means including a device which serves the double function of securing the cover and shell of the wiring device together and assisting in the mounting of the device upon the supporting bridge. The means which I have provided is adaptable for securing one or several wiring devices upon a single supporting bridge, provided the supporting ears on the frames are in alinement so that the securing member 60 may pass through the ears of several frames.

Many modifications within the scope of my invention will occur to those skilled in the art. Therefore, I do not limit the invention to the specific forms herein described.

I claim:

1. In an electric wiring apparatus, a supporting bridge having an aperture therein, a wiring device comprising a shell having an open front face, a cover for said face opening, said cover having a neck extending through said bridge aperture, a frame for holding said cover and shell together, and means engaging with said frame to hold said device on said bridge.

2. In an electric wiring apparatus, a supporting bridge having an aperture therein, a wiring device comprising a shell having an open front face, a cover for said face opening, said cover having a neck extending through said bridge aperture, a frame for holding said cover and shell together, said frame having ears extending through said bridge and means engaging with said ears to hold said device on said bridge.

3. In an electric wiring apparatus, a supporting bridge having an aperture therein, a wiring device comprising a shell having an open front face, a cover for said face opening, said cover having a neck extending through said bridge aperture, a frame for holding said cover and shell together, said frame having ears apertured in alignment, means slidable through said ear apertures to hold said device on said bridge.

4. In an electric wiring apparatus, a supporting bridge having an aperture therein, a wiring device comprising a shell having an open front face, a cover for said face opening, said cover having a neck extending through said bridge aperture, a frame for holding said cover and shell together and means engaging with portions of said frame to hold said device on said bridge.

5. In an electric wiring apparatus, a supporting bridge having an aperture therein, a wiring device comprising a shell having an open front face, a cover for said face opening, said cover having a neck extending through said bridge aperture, a frame for holding said cover and shell together and means separate from the bridge and independent of said wiring device engaging with portions of said frame for holding said device on said bridge.

6. In an electric wiring apparatus, a supporting bridge having a plurality of apertures therein for the reception of wiring devices, a plurality of wiring devices having portions extending through said apertures, a frame mounted on each device, ears on said frames extending through said bridge, and a single means engaging with said ears for holding all said devices on said bridge.

7. In electric wiring apparatus, a supporting bridge having a plurality of apertures therein for the reception of wiring devices, a plurality of wiring devices comprising a cover and shell and having portions extending through said apertures, a frame on each device securing said cover and shell together and a single means engaging with portions of said frames to hold said devices on said bridge.

8. In an electric wiring apparatus, a supporting bridge having an aperture therein, a wiring device comprising a shell having an open front face, a cover for said face opening, said cover having a neck extending through said bridge aperture, a frame having portions deformable into engagement with said device to hold said cover and shell together and means engaging with said frame to hold said device on said bridge.

9. In an electric wiring apparatus, a supporting bridge having an aperture therein, a wiring device comprising a shell having an open front face, a cover for said face opening, said cover having a neck extending through said bridge aperture, a frame having portions deformable into engagement with said device to hold said cover and shell together, said frame having portions on opposite sides of said bridge and means separable from said bridge engageable with said frame to hold said device on said bridge.

ROBERT H. BENTLEY.